United States Patent [19]

Seeliger et al.

[11] 3,846,419
[45] Nov. 5, 1974

[54] 4H-5,6-DIHYDRO-1,3-OXAZINES

[75] Inventors: Wolfgang Seeliger; Karl-Dieter Hesse, both of Marl, Germany

[73] Assignee: Chemische Werke Huls Aktiengesellschaft, Marl, Germany

[22] Filed: Feb. 15, 1972

[21] Appl. No.: 226,527

Related U.S. Application Data

[63] Continuation-in-part of Ser. No. 762,138, Sept. 24, 1968, abandoned.

[30] Foreign Application Priority Data

Sept. 29, 1967 Germany.................................. 43459

[52] U.S. Cl. ..... 260/244 R, 252/394, 260/45.8 NZ, 260/652.5 R
[51] Int. Cl............................................. C07d 87/20
[58] Field of Search...................................... 260/244

[56] References Cited

UNITED STATES PATENTS

| | | | |
|---|---|---|---|
| 3,505,297 | 4/1970 | Sheetz et al. ....................... | 260/244 |
| 3,562,263 | 2/1971 | Litt et al. ............................ | 260/244 |
| 3,573,281 | 3/1971 | Nehring............................... | 260/244 |

FOREIGN PATENTS OR APPLICATIONS

| | | | |
|---|---|---|---|
| 1,478,076 | 4/1967 | France............................. | 260/314.5 |

OTHER PUBLICATIONS

Seeliger et al., Liebigs Ann. Chem., Vol. 697, pp. 171–180, (1966).

Meyers, J. Org. Chem., Vol. 25, pp. 145–147, (1960).

*Primary Examiner*—Harry I. Moatz
*Attorney, Agent, or Firm*—Millen, Raptes & White

[57] ABSTRACT

4-Substituted-4H-5,6-dihydro-1,3-oxazines of the formula

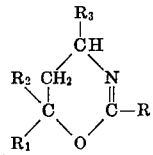

wherein R is alkyl having 1–18 carbon atoms, alkenyl having 2–18 carbon atoms, or phenyl; $R_1$ is lower alkyl, lower alkenyl, or phenyl; $R_2$ is hydrogen or methyl, and $R_3$ is lower alkyl of 1–8 carbon atoms or phenyl and is different from $R_1$. These compounds, which are stabilizers for plastics and chlorinated solvents, are prepared in one stage from: (a) an aldehyde having at least two carbon atoms; (b) an olefinically unsaturated compound; (c) a carboxylic acid amide, and (d) a strong non-oxidizing acid.

17 Claims, No Drawings

4H-5,6-DIHYDRO-1,3-OXAZINES

REFERENCE TO RELATED APPLICATION

This application is a continuation-in-part of application Ser. No. 762,138 filed Sept. 24, 1968 and now abandoned.

BACKGROUND OF THE INVENTION

This invention relates to 1,3oxazines, a group of unsaturated heterocyclic compounds having 6 nuclear atoms of which one is oxygen and one is nitrogen.

It is known that N-methylol-carbonamides (which can also be substituted in the methylol group) when reacted with olefins in the presence of strong acids, form unsaturated carboxylic acid amides which can be hydrolyzed to unsaturated amines (U.S. Pat. No. 3,190,882). The reaction of the N-methylolcarbonamides, which must be prepared in a separate stage, is effected at temperatures between 0° and 200° C. When employing the so-called active catalysts, such as hydrogen fluoride, trifluoroacetic acid or methanesulfonic acid, the reaction is preferably conducted between 10° and 120° C; when utilizing other catalysts of lesser activity, preferably at higher temperatures, namely, between 50° and 200° C.

Notwithstanding the foregoing, it is possible to react N-methylol-carboxylic acid amides (derived from formaldehyde) with olefins and strong acids to obtain 4H-5,6-dihydro-1,3-oxazines unsubstituted in the 4-position by operating at temperatures essentially below 50° C. ["Liebigs Annalen der Chemie," 697 (1966), pp. 171–180, and from French Pat. No. 1,478,076]. According to this reaction, there are first formed salts of 4H-5,6-dihydro-1,3-oxazines, from which the 1,3-oxazine bases are then liberated with the aid of alkaline agents.

The art thus teaches the production of N-methylolcarboxylic acid amides in a separate and preliminary stage. Though a desirable simplification for this reaction from a technical viewpoint would be to employ a mixture of formaldehyde and carboxylic acid amide, such a "one-pot" process has not been suggested heretofore presumably because it would have been expected that the following known side reactions would predominate, leading to substantially reduced yields and conversions, as well as difficult separation problems:

A. Aldol condensation of the aldehydes;
B. Reactions between carboxylic acid amides and aldehydes in the presence of strong acids, as described, for example, in "J. Am. Chem. Soc.," 55 (1933), p. 3494; and
C. Reactions between aldehydes and olefins, as described, for example, in "Chem. Rev.," 51 (1952), p. 506.

SUMMARY OF THE INVENTION

Bearing in mind the above background, this invention provides an unexpectedly efficient and simplified process for the production of 4-substituted-4H-5,6-dihydro-1,3-oxazines. In addition, there are provided a novel group of compounds of the formula

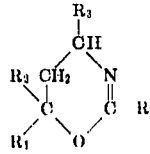

wherein R is alkyl having from 1 to 18 carbon atoms, e.g., methyl, isopropyl, undecyl and stearyl, preferably lower alkyl having from 1 to 8 carbon atoms; alkenyl having from 2 to 18 carbon atoms, preferably lower alkenyl having from 2 to 8 carbon atoms, e.g., vinyl, isopropenyl, allyl; phenyl; substituted phenyl, e.g., tolyl; or cyclohexyl;

$R_1$ is lower alkyl having from 1 to 8 carbon atoms, e.g., methyl and propyl; lower alkenyl having from 2 to 8 carbon atoms, e.g., vinyl, isopropenyl and allyl; or phenyl;

$R_2$ is hydrogen or methyl;

and $R_3$ in the 4-position is either lower alkyl having from 1 to 8 carbon atoms, e.g., methyl, ethyl, propyl, isopropyl, amyl and octyl; phenyl; or substituted phenyl, e.g., p-tolyl o- and p-chlorophenyl and m- and p-nitrophenyl, $R_3$ being different from $R_1$.

The process of this invention utilizes the following starting materials:

a. a saturated aliphatic aldehyde of at least two carbon atoms or an aromatic aldehyde;
b. an olefinically unsaturated compound, preferably a linear or cyclic olefin having from 3 to 9 carbon atoms;
c. an amide of an aliphatic (saturated or unsaturated) or an aromatic carboxylic acid; and
d. a strong, non-oxidizing acid.

A mixture of the four essential compounds, (a), (b), (c) and (d), preferably in admixture with a solvent inert with respect to each of said compounds under reaction conditions, comprises the reaction medium. Said medium is maintained at a temperature of from −10° to +50° C. until oxazine salts are formed. The 4-substituted-4H-5,6 dihydro-1,3-oxazines are liberated from the thus-formed oxazine salts in a conventional manner with the aid of alkaline agents.

Said 4-substituted-4H-5,6-dihydro-1,3-oxazines are particularly useful in minor amounts, e.g., 1.0 percent by weight, as stabilizers for plastics, such as polyvinyl chloride, and for chlorinated solvents, such as trichloroethylene. They are also useful as corrosion inhibitors, e.g., for lubricating oils, and also can be used as intermediates for pharmaceuticals. The compounds having a vinyl or isopropenyl (derived from acrylamide or methacrylamide, respectively) residue in the 2-position are particularly valuable as monomers which can be polymerized with themselves or with other vinyl compounds to form valuable fiber-forming polymers and copolymers. For such polymerization reactions, conventional free radical polymerization recipes can be used.

It is thus an object of the subject invention to provide an improved process for the production of oxazines substituted in the 4-position. It is a further object to avoid significant losses in yield due to side reactions.

A still further object is to prepare the oxazines in a one-pot process.

Another object is to provide novel chemical compounds. Additional objects will be apparent from the description contained herein.

DETAILED DISCUSSION OF THE INVENTION

Examples of suitable carboxylic acid amides (e.g.,

R—CO—NH$_2$) include, but are not limited to: alkylamides, such as acetamide, propionamide, butyramide, isobutyramide, capronamide, lauric acid amide, stearic acid amide and palmitic acid amide; alkenyl amides, such as oleic acid amide, acrylamide and methacrylamide; monocyclic arylamides, such as benzamide and o-, m- and p-tolylamides, and cycloalkylamides, such as cyclohexane carboxylic acid amide. Benzamide and lower (saturated and unsaturated) aliphatic carboxylic acid amides are particularly suitable.

Since carboxylic acid amides are formed from the corresponding carboxylic acid nitriles with sulfuric acid and water, it is possible to employ in the reaction of this invention (particularly when using a carboxylic acid amide of an unsaturated acid, such as acrylic acid) in place of the preliminarily formed carboxylic acid amides, said corresponding nitriles, e.g., acrylonitrile, which are more readily accessible.

It is also possible to use corresponding α-hydroxynitriles, such as acetone cyanohydrin, which are conventionally converted into α,β-unsaturated carboxylic acid amides or the sulfates thereof by heating with sulfuric acid.

Examples of suitable alpha olefinically unsaturated compounds are preferably those having from 3 to 9 carbon atoms, which [e.g., $CH_2 = C(R_1)R_2$] include, but are not limited to: lower alkenes, e.g., propylene, butylene-(1), butylene-(2), isobutylene, diisobutylene, 4-methylpentene-(1), butadiene-(1,3), 2,3-dimethylbutadiene-(1,3) and isoprene; lower cycloalkenes, e.g., cyclohexene; aromatic alkenes, e.g., styrene and α-methylstyrene; lower alkylene halides, e.g., allyl chloride and methallyl chloride and allyl esters, e.g., allyl acetate. Especially suitable are styrene, α-methylstyrene, isoprene and 2,3-dimethylbutadiene-(1,3).

Examples of suitable aliphatic (saturated) aldehydes, e.g., (R$_3$—CHO) include, but are not limited to: lower alkyl aldehydes, e.g., acetaldehyde, propionaldehyde, isobutyraldehyde, n-butyraldehyde, capronaldehyde and 2-ethylhexanal and monocarbocyclic aromatic aldehydes, e.g., benzaldehyde, tolylaldehyde, chlorobenzaldehyde and m- or p-nitrobenzaldehyde. The lower aliphatic saturated aldehydes are preferred; they can also be utilized in the form of a compound from which the lower aliphatic aldehyde can be readily liberated, e.g., paraldehyde.

As a strong, non-oxidizing acid (d), acids such as phosphoric acid, p-toluenesulfonic acid, sulfuric acid or BF$_3$-acetic acid complex may be used. Of these, it is particularly advantageous to use sulfuric acid. A combination of two or more of these acids may be employed. The acids are preferably diluted with a solvent. The water content of the acid is at most 30 percent and preferably not in excess of 10 percent by volume. By a "strong" acid is meant one capable of effecting the reaction, generally having an ionization constant of more than $10^{-2}$ at 20° C. in water.

The solvents employed are polar solvents which do not participate in the main reaction, for example, lower aliphatic monocarboxylic acids, e.g., hexanoic acid, n-butyric acid, iso-butyric acid, propionic acid, acetic acid and ethylene carbonate. Acetic acid is the preferred solvent.

The reaction temperature has an important influence on the progress of the reaction. As a temperature of 50° C. is exceeded, unsaturated carboxylic acid amides are obtained to an increased extent (with increased time) instead of the desired 4H-5,6-dihydro-1,3-oxazines. The process is therefore conducted at temperatures of between −10° and +50° C., preferably between 0° and +40° C., especially at temperatures between 5° and 30° C.

The four starting materials (a), (b), (c) and (d) are ordinarily employed in equimolar amounts. A molar excess of one or more individual components, for example, the aldehyde or the olefin, may be used.

The strong acid is employed in amounts of 1–2 mols, preferably in quantities of 1 to 1.5 mol/mol of the carboxylic acid amide. Since the function of the strong acid is to form the salt, a smaller amount than 1 mol/-mol of the hydro-oxazine to be formed would lead to low yields.

When using unsaturated compounds capable of free radical polymerization, such as acrylamide or methacrylamide, it is recommended to incorporate in the reaction medium at least one inhibitor, such as copper, copper compounds, e.g., Cu-acetylacetonate and Cu(I) chloride, tert.-butylpyrocatechol or N-nitrosodiphenylamine.

The process is generally conducted so that the mixture of carboxylic acid amide (c), olefinically unsaturated compound (b), and aldehyde (a) is mixed with the strong acid (d), with the above-mentioned temperatures being maintained. the reaction is preferably conducted in the presence of a solvent. Advantageously, the reaction mixture is mechanically agitated when the acid is added; in particular, the mixing process can be accomplished by stirring. It is not essential, however, that the reactants be combined precisely in this order.

The free 4H-5,6-dihydro-1,3-oxazines are isolated from the reaction mixture in a conventional manner with the aid of alkaline agents, such as an aqueous solution of sodium hydroxide or aqueous sodium carbonate solution.

Advantageously, the reaction is conducted by first precipitating initially obtained salt, e.g., hydrogen sulfate, by the addition to the reaction medium of a precipitant in which the salt has a low solubility and which, in a preferred embodiment, has a lower boiling point than the solvent used and forms an azeotrope with water, for example, benzene or hexane. After an optional intermediate purification, this salt is treated with aqueous alkali to liberate the desired product. The mother liquor obtained after the salt has been precipitated can be recycled into the process as the solvent after removing most of the precipitant and removing the water of reaction by distillation. The process of this invention can be conducted discontinuously or continuously.

Referring to the structural formula set forth in the Summary of the Invention, the process of this invention can produce an even wider group of compounds than defined by various R, $R_1$, $R_2$ and $R_3$ groups set forth therein. The only criteria are that the starting materials must be such that the various R, $R_1$, $R_2$ and $R_3$ groups do not interfere with reactions so that it does not work and the aliphatic $R_3$ groups must not be olefinically unsaturated. Until now, no such interfering groups have been found; so the process is considered to be very broad with respect to the nature of the starting materials.

Again referring to the structural formula, a preferred novel sub-generic group of compounds is that wherein R represents methyl, ethyl, propyl, undecyl, vinyl, propenyl, isopropenyl or phenyl; $R_1$ represents methyl, vinyl, propenyl, isopropenyl or phenyl; and $R_3$ represents methyl, propyl, amyl or phenyl.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

2,4,6-Trimethyl-6-phenyl-4H-5,6-dihydro-1,3-oxazine:

59 parts by weight (1mol) of acetamide, 44 parts by weight (one-third mol) of paraldehyde, 118 parts by weight (1 mol) of α-methylstyrene are dissolved in 200 ml. of glacial acetic acid and mixed dropwise within 1 hour at 5°–10° C. with a mixture of 50 ml. of glacial acetic acid and 98 parts by weight (1 mol) of $H_2SO_4$. Thereafter, the reaction is allowed to continue for 4–5 hours at room temperature; the acetic acid is distilled under vacuum, and the remaining oil is added dropwise to a well-agitated mixture of 250 g. of NaOH in 1 liter of water and 1 liter of benzene at a temperature of 10° C. The benzene phase is separated, the aqueous phase is washed an additional two times with 100 ml. of benzene, and the combined benzene extracts are dried over NaOH. After the benzene has been removed by distillation, the residue is rectified under vacuum.

| | | |
|---|---|---|
| B.P.$_{0.2}$ | : | 83 – 88° C. |
| $n_D^{20}$ | : | 1.521 |
| Yield | : | 127 parts by weight (62.5% of theory) |
| Analysis | : | $C_{13}H_{17}NO$  mol. wt. 203.28 |
| Calculated | : | C 76.81%  H 8.43% |
| Found | : | C 76.64%  H 8.60% |

EXAMPLE 2

2,4,6-Trimethyl-6-phenyl-4H-5,6-dihydro-1,3-oxazine:

As described in Example 1, 59 parts by weight (1 mol) of acetamide, 44 parts by weight (one-third mol) of paraldehyde, 118 parts by weight (1 mol) of α-methylstyrene are dissolved in 200 ml. of glacial acetic acid and mixed with 67.8 parts by weight (1 mol) of $BF_3$ in 200 ml. of glacial acetic acid. The reaction mixture is worked up as set forth in Example 1.

Yield: 103 parts by weight (50 percent of theory).

EXAMPLE 3

2,6-Dimethyl-4-isopropyl-6-phenyl-4H-5,6-dihydro-1,3-oxazine:

59 parts by weight (1 mol) of acetamide, 72 parts by weight (1 mol) of isobutyraldehyde, 118 parts by weight (1 mol) of α-methylstyrene are dissolved in 200 ml. of glacial acetic acid and mixed under stirring at 10°–15° C. with 98 parts by weight of $H_2SO_4$ in 50 ml. of glacial acetic acid (duration of dropwise addition: 45 minutes). Thereafter, the reaction mixture is allowed to stand for 2 hours at 20° C., and then the solution is stirred into 1 liter of benzene; the oily lower phase (sulfate oil) is separated and washed twice with 100 ml. of benzene. Then, the sulfate oil is added dropwise to an ice-cooled mixture of 250 g. of NaOH in 1 liter of water and 1 liter of benzene. The benzene phase is dried over NaOH and thereafter distilled.

| | | |
|---|---|---|
| B.p.$_{0.25}$ | : | 95–98° C. |
| $n_D^{20}$ | : | 1.516 |
| Yield | : | 85 parts by weight (36% of theory) |
| Analysis | : | $C_{15}H_{21}NO$  mol. wt. 231.35 |
| Calculated | : | C 77.88%  H 9.15% |
| Found | : | C 77.92%  H 9.30% |

EXAMPLE 4

2-Vinyl-4,6-dimethyl-6-phenyl-4H-5,6-dihydro-1,3-oxazine:

Under an $N_2$-atmosphere, 71 parts by weight (1 mol) of acrylamide, 44 parts by weight (one-third mol) of paraldehyde, 118 parts by weight (1 mol) of α-methylstyrene and 1 part by weight of tert.-butyl-pyrocatechol are dissolved in 200 ml. of glacial acetic acid and mixed within 45 minutes dropwise at 5°–10° C. with 98 parts by weight (1 mol) of $H_2SO_4$ (concentrated) in 50 ml. of glacial acetic acid. After a post-reaction period of 3–4 hours at 20°–25° C., the solution is poured into 1 liter of benzene; the oily lower phase (sulfate oil) is separated and washed twice with 100 ml. of benzene. Thereafter, the sulfate oil is added dropwise to an ice-cooled and well-agitated mixture of 250 g. of NaOH in 1 liter of water and 1 g. of N-nitrosodiphenylamine in 1 liter of benzene. The benzene phase is dried over NaOH and then distilled.

| | | |
|---|---|---|
| B.p.$_{0.4}$ | : | 96–98° C. |
| $n_D^{20}$ | : | 1.5385 |
| Yield | : | 150 parts by weight (70% of theory) |
| Analysis | : | $C_{14}H_{17}NO$  mol. wt. 215.29 |
| Calculated | : | C 78.11%  H 7.96%  N 6.51% |
| Found | : | C 77.99%  H 8.08%  N 6.55% |

EXAMPLE 5

2-Vinyl-4,6-dimethyl-6-phenyl-4H-5,6-dihydro-1,3-oxazine:

Under a nitrogen atmosphere at 70°–75° C., 98 parts by weight of concentrated $H_2SO_4$ (1 mol), 18 parts by weight (1 mol) of water and 0.5 part by weight of tert.-butylpyrocatechol are combined. Under stirring, 53 parts by weight (1 mol) of acrylonitrile is gradually added dropwise to this reaction mixture in such a manner that the temperature is maintained at 70°–75° C. (about 30 minutes). Thereafter, the reaction mixture is allowed to stand for 1 hour at 70° C., cooled to 40°–45° C., and 200 ml. of glacial acetic acid is added. At 5°–10° C., there are then added dropwise within 45 minutes 44 parts by weight (one-third mol) of paraldehyde and 118 parts by weight (1 mol) of α-methylstyrene. The mixture is allowed to continue the reaction for 2 hours at 20° C., and is then worked up as described in Example 3.

Yield: 109 parts by weight (50 percent of theory).

EXAMPLE 6

2-Vinyl-4-isopropyl-6-methyl-6-phenyl-4H-5,6-dihydro-1,3-oxazine:

71 parts by weight (1 mol) of acrylamide, 72 parts by weight (1 mol) of isobutyraldehyde and 118 parts by weight (1 mol) of α-methylstyrene are dissolved in 200 ml. of glacial acetic acid and mixed dropwise at 5°–10° C. within 45 minutes with 98 parts by weight (1 mol) of concentrated $H_2SO_4$ in 50 ml. of glacial acetic acid. The mixture is allowed to react for another hour at 10° C. and 1 hour at 20°–25° C. and is then worked up as set forth in Example 3.

| | | |
|---|---|---|
| $B.p._{0.2}$ | : | 98–99° C. |
| $n_D^{20}$ | : | 1.5279 |
| Yield | : | 122 parts by weight (50% of theory) |
| Analysis | : | $C_{16}H_{21}NO$   mol. wt. 243.36 |
| Calculated | : | C 78.97%   H 8.70%   N 5.76% |
| Found | : | C 79.05%   H 8.75%   N 6.10% |

EXAMPLE 7

2-Vinyl-4,6-diphenyl-6-methyl-4H-5,6-dihydro-1,3-oxazine:

71 parts by weight (1 mol) of acrylamide, 106 parts by weight (1 mol) of benzaldehyde and 118 parts by weight (1 mol) of α-methylstyrene are dissolved in 200 ml. of glacial acetic acid and mixed within 45 minutes at 10°–15° C. with 98 parts by weight (1 mol) of concentrated $H_2SO_4$ in 50 ml. of glacial acetic acid. After continuing the agitation for 2 hours at room temperature, the solution is poured into 500 ml. of benzene and worked up in accordance with Example 2.

| | | |
|---|---|---|
| $B.p._{0.3}$ | : | 157–160° C. |
| $n_D^{20}$ | : | 1.582 |
| Yield | : | 138 parts by weight (50% of theory) |
| Analysis | : | $C_{19}H_{19}NO$   mol. wt. 277.36 |
| Calculated | : | C 82.29%   H 6.91%   N 5.05% |
| Found | : | C 81.90%   H 7.07%   N 4.80% |

COMPARATIVE EXAMPLE

2-Vinyl-6-methyl-6-phenyl-hydro-oxazine:

71 parts by weight (1 mol) of acrylamide, 30 parts by weight (1 mol) of paraformaldehyde, 118 parts by weight (1 mol) of α-methylstyrene and 1 part by weight of tert.-butyl-pyrocatechol are dissolved in 200 ml. of glacial acetic acid and mixed dropwise within 45 minutes, at 10° C., with a mixture of 98 parts by weight of $H_2SO_4$ (1 mol) and 50 ml. of glacial acetic acid. Thereafter, the mixture is allowed to react for 1 hour at 10° C. and 1 hour at 25° C. and then worked up in accordance with Example 3.

| | | |
|---|---|---|
| $B.p._{0.2}$ | : | 97–99° C. |
| $n_D^{20}$ | : | 1.546 |
| Yield | : | 47 parts by weight (23% of theory) |
| Analysis | : | $C_{13}H_{15}NO$   mol. wt. 201.27 |
| Calculated | : | C 77.58%   H 7.51%   N 6.96% |
| Found | : | C 76.98%   H 7.33%   N 6.88% |

EXAMPLE 8

2-Vinyl-4-methyl-6-phenyl-4H-5,6-dihydro-1,3-oxazine:

71 parts by weight (1 mol) of acrylamide, 44 parts by weight (one-third mol) of paraldehyde, 104 parts by weight (1 mol) of styrene and 1 part by weight of tert.-butylpyrocatechol are dissolved in 200 ml. of glacial acetic acid and reacted, as described in Example 3, with 98 parts by weight (1 mol) of concentrated $H_2SO_4$.

| | | |
|---|---|---|
| $B.p._{0.6}$ | : | 100–103° C. |
| $n_D^{20}$ | : | 1.545 |
| Yield | : | 112 parts by weight (55% of theory) |
| Analysis | : | $C_{13}H_{15}NO$   mol. wt. 201.27 |
| Calculated | : | C 77.58%   H 7.51%   N 6.96% |
| Found | : | C 77.22%   H 7.55%   N 7.29% |

EXAMPLE 9

2,6-Divinyl-4,6-dimethyl-4H-5,6-dihydro-1,3-oxazine:

In accordance with Example 4, 53 parts by weight (1 mol) of acrylonitrile is saponified with 98 parts by weight of concentrated $H_2SO_4$ and 18 parts by weight of water, and then reacted with 68 parts by weight (1 mol) of isoprene and 44 parts by weight (one-third mol) of paraldehyde.

| | | |
|---|---|---|
| $B.p._{2.0}$ | : | 93–94° C. |
| $n_D^{20}$ | : | 1.478 |
| Yield | : | 58 parts by weight (35% of theory) |
| Analysis | : | $C_{10}H_{15}NO$   mol. wt. 165.24 |
| Calculated | : | C 72.69%   H 9.15%   N 8.48% |
| Found | : | C 72.20%   H 9.14%   N 8.49% |

EXAMPLE 10

2-Isopropenyl-4,6-dimethyl-6-phenyl-4H-5,6-dihydro-1,3-oxazine:

In accordance with Example 3, 85 parts by weight (1 mol) of methacrylamide, 44 parts by weight (1 mol) of paraldehyde and 118 parts by weight (1 mol) of α-methylstyrene are reacted at 5°–10° C. in 200 ml. of glacial acetic acid with 98 parts by weight (1 mol) of concentrated $H_2SO_4$ in 50 ml. of glacial acetic acid.

| | | |
|---|---|---|
| $B.p._{0.5}$ | : | 100–102° C. |
| $n_D^{20}$ | : | 1.536 |
| Yield | : | 115 parts by weight (50% of theory) |
| Analysis | : | $C_{15}H_{19}NO$   mol. wt. 229.31 |
| Calculated | : | C 78.56%   H 8.35%   N 6.11% |
| Found | : | C 78.02%   H 8.15%   N 6.37% |

EXAMPLE 11

2-Isopropyl-4,6-dimethyl-6-phenyl-4H-5,6-dihydro-1,3-oxazine:

In accordance with Example 1, 81 parts by weight (1 mol) of isobutyramide, 44 parts by weight (one-third mol) of paraldehyde and 118 parts by weight (1 mol) of α-methylstyrene are reacted in 200 ml. of glacial acetic acid at 10° C. with 98 parts by weight (1 mol) of concentrated $H_2SO_4$ in 50 ml. of glacial acetic acid.

| | | |
|---|---|---|
| $B.p._{22}$ | : | 150–153° C. |
| $n_D^{20}$ | : | 1.5096 |
| Yield | : | 140 parts by weight (60% of theory) |
| Analysis | : | $C_{15}H_{21}NO$   mol. wt. 231.35 |
| Calculated | : | C 77.88%   H 9.15%   N 6.06% |
| Found | : | C 77.53%   H 9.14%   N 5.68% |

EXAMPLE 12

2,6-Dimethyl-4-pentyl-6-phenyl-4H-5,6-dihydro-1,3-oxazine:

In accordance with Example 1, 59 parts by weight (1 mol) of acetamide, 100 parts by weight (1 mol) of capronaldehyde and 118 parts by weight (1 mol) of α-methylstyrene in 200 ml. of glacial acetic acid are reacted at 10° C. with 98 parts by weight of concentrated $H_2SO_4$ in 50 ml. of glacial acetic acid.

| | | |
|---|---|---|
| $B.p._{0.2}$ | : | 110–112° C. |
| Yield | : | 85 parts by weight (33% of theory) |
| Analysis | : | $C_{17}H_{25}NO$  mol. wt. 259.38 |
| Calculated | : | C 78.71%   H 9.72%   N 5.40% |
| Found | : | C 78.13%   H 9.95%   N 5.33% |

EXAMPLE 13

2,6-Diphenyl-4,6-dimethyl-4H-5,6-dihydro-1,3-oxazine:

According to Example 1, 121 parts by weight (1 mol) of benzamide, 44 parts by weight (one-third mol) of paraldehyde and 118 parts by weight (1 mol) of α-methylstyrene are reacted in 300 ml. of glacial acetic acid at 5°–10° C. with 98 parts by weight (1 mol) of concentrated $H_2SO_4$.

| | | |
|---|---|---|
| $B.p._{0.2}$ | : | 148–150° C. |
| $n_D^{20}$ | : | 1.579 |
| Yield | : | 116 parts by weight (44% of theory) |
| Analysis | : | $C_{18}H_{19}NO$  mol. wt. 265.34 |
| Calculated | : | C 81.47%   H 7.22%   N 5.28% |
| Found | : | C 81.21%   H 7.21%   N 5.26% |

EXAMPLE 14

2-Undecyl-4,6-dimethyl-6-phenyl-4H-5,6-dihydro-1,3-oxazine:

199 parts by weight (1 mol) of lauric acid amide, 118 parts by weight (1 mol) of α-methylstyrene and 44 parts by weight (one-third mol) of paraldehyde are dissolved in 600 ml. of glacial acetic acid. At 20° C., 100 parts by weight (1 mol) of concentrated $H_2SO_4$ in 50 ml. of glacial acetic acid is added dropwise within 30 minutes; the reaction mixture is allowed to react for 2 hours at 25° C., and then the acetic acid is distilled off under vacuum. The oily residue is neutralized in accordance with Example 1.

| | | |
|---|---|---|
| $B.p._{0.01}$ | : | 150–155° C. |
| $n_D^{20}$ | : | 1.498 |
| Yield | : | 140 parts by weight (40% of theory) |
| Analysis | : | $C_{23}H_{37}NO$  mol. wt. 343.53 |
| Calculated | : | C 80.41%   H 10.86%   N 4.08% |
| Found | : | C 80.29%   H 10.83%   N 3.81% |

EXAMPLE 15

2-Vinyl-4-n-propyl-6-methyl-6-phenyl-4H-5,6-dihydro-1,3-oxazine:

In accordance with Example 5, 71 parts by weight (1 mol) of acrylamide, 72 parts by weight (1 mol) of n-butyraldehyde and 118 parts by weight (1 mol) of α-methylstyrene are dissolved in 200 ml. of glacial acetic acid and reacted with 100 parts by weight (1 mol) of concentrated $H_2SO_4$ in 50 ml. of glacial acetic acid.

| | | |
|---|---|---|
| $B.p._{0.2}$ | : | 104–105° C. |
| $n_D^{20}$ | : | 1.528 |
| Yield | : | 104 parts by weight (44% of theory) |
| Analysis | : | $C_{16}H_{21}NO$  mol. wt. 243.36 |
| Calculated | : | C 78.97%   H 8.70%   N 5.76% |
| Found | : | C 78.51%   H 8.77%   N 5.75% |

EXAMPLE 16

2-Isopropenyl-4,6-dimethyl-6-vinyl-4H-5,6-dihydro-1,3-oxazine:

In accordance with Example 3, 85 parts by weight (1 mol) of methylacrylamide, 44 parts by weight (one-third mol) of paraldehyde and 68 parts by weight (1 mol) of isoprene are reacted with 98 parts by weight (1 mol) of concentrated $H_2SO_4$ in 50 ml. of glacial acetic acid.

| | | |
|---|---|---|
| $B.p._{.27}$ | : | 99–102° C. |
| $n_D^{20}$ | : | 1.477 |
| Yield | : | 55 parts by weight (31% of theory) |
| Analysis | : | $C_{11}H_{17}NO$  mol. wt. 179.26 |
| Calculated | : | C 73.70%   H 9.56%   N 7.81% |
| Found | : | C 73.26%   H 9.60%   N 7.77% |

EXAMPLE 17

2-Propenyl-4,6-dimethyl-6-phenyl-4H-5,6-dihydro-1,3-oxazine:

In accordance with Example 3, 85 parts by weight (1 mol) of crotonic acid amide, 44 parts by weight (one-third mol) of paraldehyde and 118 parts by weight (1 mol) of α-methylstyrene are reacted with 98 parts by weight (1 mol) of concentrated $H_2SO_4$ in 50 ml. of glacial acetic acid.

| | | |
|---|---|---|
| $B.p._{0.1}$ | : | 105–110° C. |
| $n_D^{20}$ | : | 1.536 |
| Yield | : | 106 parts by weight (45% of theory) |
| Analysis | : | $C_{15}H_{19}NO$  mol. wt. 229.31 |
| Calculated | : | C 78.56%   H 8.35%   N 6.11% |
| Found | : | C 78.29%   H 8.34%   N 5.91% |

EXAMPLE 18

2,4,6-Trimethyl-6-isopropenyl-4H-5,6-dihydro-1,3oxazine:

In accordance with Example 1, 59 parts by weight (1 mol) of acetamide, 44 parts by weight (one-third mol) of paraldehyde and 82 parts by weight (1 mol) of 2,3-dimethyl-butadiene-(1,3) are reacted with 98 parts by weight (1 mol) of concentrated $H_2SO_4$ in 50 ml. of glacial acetic acid.

| | | |
|---|---|---|
| $B.p._{.28}$ | : | 95–96° C. |
| $n_D^{20}$ | : | 1.463 |
| Yield | : | 65 parts by weight (39% of theory) |
| Analysis | : | $C_{10}H_{17}NO$  mol. wt. 167.24 |
| Calculated | : | C 71.81%   H 10.25%   N 8.38% |
| Found | : | C 71.32%   H 10.36%   N 8.42% |

EXAMPLE 19

2,4-Dimethyl-6-phenyl-4H-5,6-dihydro-1,3-oxazine:

In accordance with Example 1, 59 parts by weight (1 mol) of acetamide, 44 parts by weight (one-third mol) of paraldehyde and 104 parts by weight (1 mol) of styrene are reacted with 100 parts by weight (1 mol) of concentrated $H_2SO_4$.

| | | | | |
|---|---|---|---|---|
| $B.p._{0.09}$ | : | 75° C. | | |
| $n_D^{20}$ | : | 1.527 | | |
| Yield | : | 75 parts by weight (40% of theory) | | |
| Analysis | : | $C_{12}H_{15}NO$ | mol. wt. 189.25 | |
| Calculated | : | C 76.15% | H 7.99% | N 7.40% |
| Found | : | C 76.42% | H 8.10% | N 7.50% |

EXAMPLE 20

2-Vinyl-4,6,6-trimethyl-4H-5,6-dihydro-1,3-oxazine:

In accordance with Example 3, 71 parts by weight (1 mol) of acrylamide, 44 parts by weight (one-third mol) of paraldehyde and 58 parts by weight of isobutene are reacted with 100 parts of concentrated $H_2SO_4$.

| | | | | |
|---|---|---|---|---|
| $B.p._{17}$ | : | 71-72° C. | | |
| $n_D^{20}$ | : | 1.463 | | |
| Yield | : | 47 parts by weight (31% of theory) | | |
| Analysis | : | $C_9H_{19}NO$ | mol. wt. 153.22 | |
| Calculated | : | C 70.55% | H 9.87% | N 9.14% |
| Found | : | C 70.56% | H 9.92% | N 9.32% |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of a 4H-5,6-dihydro-1,3-oxazine substituted in the 4-position which comprises reacting in one stage a mixture comprising
   a. an aldehyde selected from the group consisting of a saturated aliphatic aldehyde having at least 2 carbon atoms and an aromatic aldehyde containing no olefinic unsaturation;
   b. an α-olefin of 3 – 9 carbon atoms;
   c. a carboxylic acid amide selected from the group consisting of alkyl amides, alkenyl amides, monocyclic arylamides and cycloalkylamides; and
   d. a strong, non-oxidizing acid,
   said reacting being conducted at a temperature between −10° and 50° until an oxazine salt is formed.

2. A process according to claim 1 wherein the carboxylic acid amide (c) is formed in situ from a corresponding member selected from the group consisting of a carboxylic acid nitrile and an α-hydroxynitrile.

3. A process as defined by claim 1 wherein said amide is a lower aliphatic amide.

4. A process according to claim 1 wherein said mixture further includes a polar inert solvent.

5. A process according to claim 1 wherein said amide is selected from the group consisting of lower alkyl amides, lower alkenyl amides and benzamide.

6. A process according to claim 1 wherein said olefinically unsaturated compound is selected from the group consisting of lower alkenes, 1,3-dienes lower cycloalkenes, aromatic alkenes, lower alkylene halides and allyl esters.

7. A process according to claim 1 wherein said olefinically unsaturated compound is selected from the group consisting of styrene, α-methylstyrene, isoprene and 2,3-dimethylbutadiene (1,3).

8. A process according to claim 1 wherein said aldehyde is a lower aliphatic aldehyde or a monocarboxylic aromatic aldehyde.

9. A process according to claim 8 wherein said aldehyde is a lower alkyl aldehyde.

10. A process according to claim 1 wherein said acid is sulfuric acid.

11. A process according to claim 10 wherein said sulfuric acid has a water content of 10-30 vol. percent.

12. A process according to claim 4 wherein said polar solvent is a lower aliphatic monocarboxylic acid.

13. A process according to claim 12 wherein said acid is acetic acid.

14. A process according to claim 1 wherein the temperature is 0°–40° C.

15. A process according to claim 1 wherein said reaction mixture further comprises at least one free radical polymerization inhibitor.

16. A process according to claim 1 wherein said oxazine is

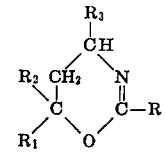

wherein R is a member selected from the group consisting of alkyl having from 1-18 carbon atoms, alkenyl having from 2-18 carbon atoms and phenyl; $R_1$ is a member selected from the group consisting of lower alkyl, lower alkenyl and phenyl; $R_2$ is a member selected from the group consisting of hydrogen and methyl; and $R_3$ is phenyl or lower alkyl of 1 to 8 carbon atoms and is different from $R_1$.

17. A process according to claim 1, further comprising liberating the free oxazine from said organic salt by the addition of alkaline agent, and isolating the free 4H-5,6-dihydro-1,3-oxazine product from the reaction mixture.

* * * * *